Patented July 31, 1945

2,380,675

UNITED STATES PATENT OFFICE 2,380,675

CATALYST SEPARATION IN HYDROGEN BROMIDE CATALYZED OXIDATION REACTIONS

Frederick F. Rust, Berkeley, Calif., and Edward R. Bell, Norwalk, Ohio, assignors to Shell Development Company, San Francisco, Calif., a corporation of Delaware No Drawing. Application March 13, 1944, Serial No. 526,334

12 Claims. (Cl. 260—586)

This invention relates to processes dealing with the controlled oxidation of organic compounds, and more particularly to improvements for effecting the production and recovery, on an industrially practical scale, of oxygenated and/or oxidized organic products which are formed by the controlled oxidation of organic compounds, particularly hydrocarbons, with oxygen or an oxygen-containing material, e. g. air, and in the presence of hydrogen bromide employed as a catalyst.

Although it is known that various hydrocarbons and their derivatives may be oxidized by subjecting them to the action of oxygen or of other oxidizing substances both in the presence and in the absence of various catalysts, as a general rule most, if not all, of these oxidation reactions result in considerable decomposition of the starting organic material, the reaction mixtures thus formed comprising various percentages of compounds which have been oxidized to a greater or lesser degree and contain varied numbers of carbon atoms per molecule due to carbon-to-carbon bond scission and to other side reactions of the type of polymerization and condensation.

Although most of the oxygenated organic compounds formed as a result of partial (incomplete) oxidations of hydrocarbons and/or of their organic derivatives are generally more valuable than the primary materials subjected to the oxidation reaction, it is frequently desirable to obtain reaction products which predominate in carboxylic acids, organic peroxides and/or ketones rather than to obtain complex mixtures containing these or some of these compounds together with large amounts of other oxygenated compounds such as carbon dioxide, aldehydes, alcohols, lactones, etc., which may or may not have the same number of carbon atoms per molecule as the starting organic material subjected to oxidation. Also, it is usually desirable to obtain predetermined compounds having the same number of carbon atoms per molecule as the starting organic material or, in some cases, twice the number of carbon atoms present in such material.

It has been discovered that the above-mentioned and other desired results may be attained by subjecting organic compounds having at least one replaceable hydrogen atom to a partial, controlled oxidation in the presence of hydrogen bromide employed as a catalyst. More specifically stated, it was found that the above-mentioned and hereinbelow more fully described class of organic compounds may be subjected to a controlled non-explosive oxidation (with oxygen or an oxygen-containing gas) in the presence of a catalyst consisting of or comprising hydrogen bromide, or a compound capable of yielding hydrogen bromide under the operating conditions, this oxidation being effected at temperatures which are between about 100° C. and the spontaneous combustion temperature of the mixture, in the dark or under the deliberate influence of ultraviolet radiations (particularly those having wavelengths of below about 2900 to 3000 Angstrom units), and in the presence or absence of certain substances which sensitize the reaction, and that such a reaction results in the formation of high yields of desirable carboxylic acids, organic peroxides, organic hydroperoxides, phenols and/or ketones containing at least the same number of carbon atoms per molecule as the starting organic material thus subjected to oxidation. This is disclosed and claimed in the copending patent application, Serial No. 474,223, filed Jan. 30, 1943, as well as in the various patent applications mentioned therein.

The above-outlined inventions are predicated on the discovery that the presence of the hydrogen bromide during the oxidation of the mentioned class of organic compounds controls the oxidation reaction so that said oxidation occurs on the carbon atom or atoms to which a halogen atom, e. g., bromine atom, would normally attach itself if the starting material were to be subjected to a halo-substitution reaction. Also, the presence of the hydrogen bromide, besides retarding the explosion or complete combustion of the starting organic material, has the effect of inhibiting the decomposition of the carbon structure of such organic material, so that the resultant oxygenated compound or compounds contain the same number of carbon atoms per molecule as the starting material or, as in the case of certain organic peroxides formed by such oxidation, contain twice the number of carbon atoms per molecule as are present in the organic material treated.

The above-outlined controlled catalyzed oxidation is applicable to the treatment of all organic compounds containing at least one replaceable hydrogen atom, the process being particularly applicable to the controlled oxidation of aliphatic hydrocarbons, especially saturated straight chain and branched chain aliphatic hydrocarbons, as well as of aromatic hydrocarbons, alkylated aromatic hydrocarbons and alicyclic hydrocarbons which may or may not contain one or more saturated or unsaturated aliphatic side chains, and of their derivatives such as products of their partial halo-substitution. Also, various other organic derivatives, e. g. nitriles, ketones, etc., fall within the class of compounds which may be thus catalytically oxidized in the presence of hydrogen bromide. For example, the oxidation of methyl ethyl ketone results in the formation of diacetyl.

The oxygenated product or products formed as a result of the mentioned hydrogen bromide catalyzed oxidation reaction will naturally depend on the particular starting organic compound employed and, at least in some instances, on the operating conditions used as well as on the concentration of the hydrogen bromide in the reacting mixture. For instance, the oxidation of propane in accordance with the above-outlined process results in the production of acetone, the reaction product also containing some propionic acid; the oxidation of ethane forms acetic acid; while the oxidation of n-butane with oxygen, in the presence of hydrogen bromide and under the aforesaid operating conditions, results in the formation of a reaction product containing diacetyl and methyl ethyl ketone. Similarly, the hydrogen bromide catalyzed oxidation of toluene produces benzoic acid, while a like treatment of ethyl benzene with oxygen results in the formation of a reaction mixture containing acetophenone. The oxidation of alicyclic hydrocarbons in accordance with the outlined process forms alicyclic ketonic compounds, cyclopentanone and cyclohexanone being produced by the treatment of cyclopentane and cyclohexane, respectively. On the other hand, the reaction of an organic compound containing a tertiary carbon atom of aliphatic character, particularly of a saturated aliphatic hydrocarbon which contains a tertiary carbon atom, with oxygen and in the presence of the hydrogen bromide catalyst results in the formation of organic peroxidic compounds the specific character of which depends, in part, on the operating conditions employed and the catalyst concentration. For instance, with relatively low hydrogen bromide concentrations and with short contact periods, the oxidation of isobutane will form a reaction product containing a substantial amount of tertiary butyl hydroperoxide while, in cases where the reaction is effected with relatively longer contact periods and with higher hydrogen bromide concentrations, greater amounts of di-(tertiary butyl) peroxide will be found in the reaction product.

Although the mentioned oxidation of organic compounds in the presence of hydrogen bromide may be effected in the liquid phase, it is generally preferable to conduct this oxidation reaction in the vapor state because it is usually difficult to maintain a desirable relatively high oxygen concentration in the mixture subjected to treatment when the reaction is conducted in the liquid phase. Generally, the reactants, i. e. the organic material, such as a hydrocarbon, and the oxygen, together with the hydrogen bromide catalyst, are first mixed in desirable or optimum ratios and the mixture thus formed, with or without preheating, is conveyed in the vapor state through a reaction zone maintained at a suitable oxidation temperature, the rate of throughput being controlled so as to permit an adequate residence time. Although the hydrogen bromide acts as a catalyst which promotes the desired oxidation reaction and retards or inhibits decomposition of the carbon structure of the organic compound oxidized, a portion of this catalyst reacts to form by-products of the type of organic bromides and molecular bromine. Nevertheless, at least a substantial portion of the hydrogen bromide passes through the reaction zone in an unchanged state, so that the effluent mixture leaving the oxidation reactor contains greater or lesser percentages of hydrogen bromide as well as the organic oxygenated product or products and some of the starting reactants, i. e. the unreacted oxygen and the unreacted portion of the organic compound subjected to the catalyzed oxidation.

It has now been discovered that, in spite of the fact that it is necessary to have hydrogen bromide present during the mentioned oxidation reaction in which it acts as the catalyst, the continued presence thereof in the reaction products is highly undesirable particularly when the latter predominates in or contains ketonic compounds. It has been further discovered that the presence of hydrogen bromide is particularly undesirable when the effluent mixture obtained as a result of the mentioned oxidation reaction and containing ketonic compounds is cooled to effect the condensation of the normally liquid constituents thereof. This invention is predicated on the discovery that the hydrogen bromide catalyzes certain side-reactions, and particularly the condensation of the ketonic compounds, so that the continued presence of hydrogen bromide in the effluent mixture leaving the oxidation zone, especially during the subsequent treatment of such reaction products to recover therefrom the desired products of oxidation, will result in a material decrease in the recoverable yield of the latter, especially when these comprise or consist of ketones (which term is employed herein and in the appended claims to denote both the monoketones and the polyketones). In view of the detrimental effect of hydrogen bromide on at least some of the desired oxygenated organic compounds, e. g. ketones, it is necessary, in accordance with the process of the present invention, to render the hydrogen bromide innocuous. This may be effected by contacting the reaction products with a compound or compounds which will render the hydrogen bromide harmless and thus prevent it from catalyzing the condensation of the ketones present in the reaction mixture formed as a result of the mentioned oxidation reaction. Since the detrimental effect of hydrogen bromide on the above-mentioned oxygenated organic products is especially severe and noticeable when these are in the liquid state or phase, the immunization of the hydrogen bromide is preferably effected in accordance with the process of the present invention prior to substantial liquefaction of the reaction products leaving the oxidation reaction zone. This may be realized by contacting the effluent reaction products with a basic or basic-acting compound or medium substantially as soon as the reaction products leave the oxidation reaction zone.

A preferred method of rendering the hydrogen bromide innocuous is to contact the reaction product, substantially as soon as it leaves the oxidation reaction zone, and preferably prior to the condensation of the normally liquid constituents thereof, with a suitable basic or basic-acting compound, thereby causing an interaction thereof with the hydrogen bromide to form the corresponding bromide salt the presence of which in the reaction product is inoffensive in that these bromide salts will not catalyze any undesirable side reactions thereby permitting the recovery of high yields of the desirable oxygenated organic products, e. g. ketones, formed during the controlled, hydrogen bromide catalyzed oxidation reaction.

Any basic or basic-acting compound may be used for the purpose of neutralizing the hydrogen bromide. Suitable basic compounds are the metal oxides, the metal hydroxides, the metal carbonates, the metal bicarbonates, the metal borates, etc. A preferred group includes the alkali and alkaline earth metal hydroxides, as well as the corresponding basic-reacting salts of these strong bases and of weak acids such as the carbonates, borates, etc. In some cases, where it may be desirable, ammonia, basic ammonium compounds and even organic bases such as the amines, hydroxyl amines, etc., may also be used. The basic compound may be employed in the form of its solution or suspension in a suitable medium, e. g. water. However, it is possible, and in some cases even preferable, to employ the basic or basic-reacting compound in the solid state, in which case these compounds may be in the form of relatively large lumps or granules, as finely divided particles, or even deposited on suitable carrier materials.

The process of the invention may be executed in a variety of manners and in a variety of suitable types of apparatus. It was stated above that it is preferred to contact the effluent mixture, substantially as soon as it leaves the oxidation reaction zone, with the mentioned basic or basic-acting compound. If the latter is in the liquid state, e. g. in solution or in suspension in water, the vaporous effluent reaction mixture, immediately after it leaves the reactor, may be conveyed countercurrently to or concurrently with a stream of such solution or suspension which is, for example, sprayed down a vertically disposed column. Also, the vaporous reaction products may be bubbled through a solution of the basic compound, or may be contacted, in their passage to the condenser, with solid particles of such basic or basic-acting compound. Obviously, the contact time must be sufficient to permit a complete or at least a substantially complete reaction between all of the hydrogen bromide in the product resulting from the oxidation reaction and the basic or basic-acting compound, the amount of the latter to be employed for this purpose depending on the particular reagent employed, the quantity of hydrogen bromide in the effluent mixture treated, etc.

The detailed practice of the present invention may be conveniently described with reference to the production and recovery of a ketone, e. g. acetone. It has been shown that when a saturated aliphatic hydrocarbon having at least three carbon atoms in the molecule is reacted with oxygen in the presence of hydrogen bromide and at a temperature which is between about 100° C. and the spontaneous combustion temperature, the reaction product will predominate in or contain an appreciable amount of a ketone or ketones having the same number of carbon atoms per molecule as present in the hydrocarbon thus treated. For instance, and as a specific example, when a vaporous mixture of propane, oxygen and hydrogen bromide (employed in a volumetric ratio of 2:2:1) was subjected to a temperature of about 188° C. for about 3 minutes, the reaction product leaving the reaction zone contained about 76 mol per cent of acetone as calculated on the propane used, and about 11.2 mol per cent of propionic acid. Since the continued presence of hydrogen bromide during the subsequent treatment of the reaction mixture causes condensation of the acetone to mesityl oxide and higher molecular weight products, the effluent mixture leaving the oxidation reaction zone must be, in accordance with the preferred embodiment of this invention, contacted (substantially immediately after leaving the reactor) with, for example, an aqueous solution of sodium carbonate. Such a treatment will cause an interaction between this basic-reacting compound and the hydrogen bromide to form sodium bromide which latter does not catalyze the condensation of acetone. The reaction mixture may then be readily worked up to recover therefrom both or either of the desired oxygenated products, viz. acetone and propionic acid.

As another illustrative example, a vaporous mixture containing 2 parts by volume of n-butane, 2 parts by volume of oxygen and 1 part by volume of hydrogen bromide was subjected to a temperature of about 183° C. for a period of about 3 minutes. The effluent reaction mixture obtained as a result of this treatment was cooled to condense the normally liquid fraction which was then further treated to separate therefrom the oxygenated compounds formed. It was found that such a treatment resulted in the formation of considerable amounts of products of condensation. On the other hand, when the effluent product from the above-mentioned oxidation was introduced, substantially as soon as it left the oxidation reactor, into an aqueous sodium carbonate solution, a subsequent analysis of the reaction product showed that methyl ethyl ketone and diacetyl were formed and recovered in a yield of about 52% as calculated on the consumed butane. Substantially no products of condensation of these ketonic compounds were found in this reaction product.

Similarly, analyses of reaction products obtained from the hydrogen bromide catalyzed oxidations of cyclopentane, cyclohexane and ethyl benzene showed that considerable condensation of the ketonic compounds formed by such oxidations, namely cyclopentanone, cyclohexanone and acetophenone, respectively, was obtained in each case. However, when the reaction mixtures obtained as a result of these oxidations were substantially immediately contacted with sodium carbonate or calcium carbonate, no condensation occurred, so that it was possible to recover satisfactorily high yields of these desirable ketones.

When the effluent mixture resulting from the mentioned hydrogen bromide catalyzed oxidation is cooled to condense the normally liquid fraction containing the desirable oxygenated products, this liquid phase also contains a portion of the hydrogen bromide dissolved therein, the remaining hydrogen bromide being found in the uncondensed gases. Due to the relatively high cost of hydrogen bromide, it is usually necessary to recover most, if not all, of it from the reaction products. Since, as stated, the hydrogen bromide will be found in both the liquid and the vapor phases, it is therefore necessary to treat both of these fractions, thus materially complicating and greatly increasing the initial and operating costs of the process, particularly when air is employed as a source of oxygen for the oxidation step. It was stated that the reaction of the effluent mixture with a basic or basic-acting compound forms the corresponding bromide of this compound, this bromide being found in the liquid phase. Therefore, when the process is effected in accordance with the present invention, the separation of the bromide salt and the ultimate regeneration of the hydrogen bromide therefrom are materially facilitated. For instance, the bromide salt may be contacted with chlorine in the presence of steam. This causes the evolution of bromine which may be reacted with hydrogen to form hydrogen bromide, thus providing a continuous process in which the regenerated hydrogen bromide may be recycled for the purpose of catalyzing the oxidation of additional amounts of organic compounds. Obviously, other methods of converting the neutral bromides to hydrogen bromide may also be employed.

The term "basic compound" as employed herein and in the appended claims includes the various basic-acting compounds of the type disclosed above.

We claim as our invention:

1. A continuous process for the production and recovery of acetone which comprises continuously contacting a vaporous mixture comprising propane and oxygen with hydrogen bromide, at a temperature of between about 100° C. and the temperature at which spontaneous combustion of the mixture occurs, and for a period of the time sufficient to effect the controlled catalytic oxidation of the propane to acetone, continuously contacting the vaporous reaction mixture, substantially as soon as it is formed, with an aqueous sodium carbonate solution thereby forming sodium bromide by the reaction of the sodium carbonate with the hydrogen bromide in said vaporous reaction mixture, separating the normally liquid fraction containing the acetone and the sodium bromide, separately recovering said acetone and said sodium bromide, treating said sodium bromide to regenerate hydrogen bromide therefrom, and continuously recycling at least a portion of said regenerated hydrogen bromide to catalyze the controlled oxidation of further amounts of propane.

2. A process for the production and recovery of acetone which comprises reacting a vaporous mixture comprising propane and oxygen in the presence of hydrogen bromide and at a temperature of between about 100° C. and the temperature at which spontaneous combustion of the mixture occurs, effecting said reaction for a period of time sufficient to cause controlled catalytic oxidation of the propane to form acetone, contacting the effluent reaction mixture, substantially as soon as formed, with an aqueous sodium carbonate solution thereby forming sodium bromide by the reaction of the sodium carbonate with the hydrogen bromide present in said effluent mixture, and recovering the acetone from the resulting reaction mixture.

3. A process for the production and recovery of acetone which comprises reacting a vaporous mixture comprising propane and oxygen in the presence of hydrogen bromide, at a temperature of between about 100° C. and the temperature at which spontaneous combustion of the mixture occurs, and for a period of time sufficient to effect the controlled catalytic oxidation of the propane to form acetone, contacting at least a portion of the effluent reaction mixture, substantially as soon as formed, with sodium carbonate thereby effecting a reaction between said sodium carbonate and the hydrogen bromide present in the effluent mixture, separating the normally liquid fraction from the resulting reaction mixture, and recovering acetone from said last-mentioned fraction.

4. A process for the production and recovery of acetone which comprises reacting a vaporous mixture comprising propane and oxygen in the presence of hydrogen bromide, at a temperature of between about 100° C. and the temperature at which spontaneous combustion of the mixture occurs, and for a period of time sufficient to effect the controlled catalytic oxidation of the propane to form acetone, contacting at least a portion of the effluent reaction mixture, substantially as soon as formed, with a basic compound thereby effecting a reaction between said basic compound and the hydrogen bromide present in the effluent mixture, separating the normally liquid fraction from the resulting reaction mixture, and recovering acetone from said last-mentioned fraction.

5. A process for the production and recovery of ketonic compounds which comprises reacting a saturated aliphatic hydrocarbon having at least three carbon atoms per molecule and oxygen in the presence of hydrogen bromide, at a temperature of between about 100° C. and the temperature at which spontaneous combustion of the mixture occurs, and for a period of time sufficient to effect the controlled catalytic oxidation of the saturated aliphatic hydrocarbon to form a ketonic compound having the same number of carbon atoms in the molecule as the starting hydrocarbon employed, contacting at least a portion of the effluent mixture, substantially as soon as formed, with a basic compound thereby effecting a reaction between said basic compound and the hydrogen bromide present in the effluent mixture, and recovering the ketonic compound from the resulting mixture.

6. A process for the production and recovery of cyclohexanone which comprises reacting a vaporous mixture comprising cyclohexane and oxygen in the presence of hydrogen bromide, at a temperature of between about 100° C. and the temperature at which spontaneous combustion of the mixture occurs, and for a period of time sufficient to effect the controlled catalytic oxidation of the cyclohexane to form cyclohexanone, contacting at least a portion of the effluent reaction mixture, substantially as soon as formed, with sodium carbonate thereby effecting a reaction between said sodium carbonate and the hydrogen bromide present in the effluent mixture, separating the normally liquid fraction from the resulting reaction mixture, and recovering cyclohexanone from said last-mentioned fraction.

7. A process for the production and recovery of cyclohexanone which comprises reacting a vaporous mixture comprising cyclohexane and oxygen in the presence of hydrogen bromide, at a temperature of between about 100° C. and the temperature at which spontaneous combustion of the mixture occurs, and for a period of time sufficient to effect the controlled catalytic oxidation of the cyclohexane to form cyclohexanone, contacting at least a portion of the effluent mixture, substantially as soon as formed, with a basic compound thereby effecting a reaction between said basic compound and the hydrogen bromide present in the effluent mixture, and recovering cyclohexanone from the resulting product.

8. A process for the production and recovery of ketonic compounds which comprises reacting an alicyclic hydrocarbon with oxygen in the presence of hydrogen bromide, at a temperature of between about 100° C. and the temperature at which spontaneous combustion of the mixture occurs, and for a period of time sufficient to effect the controlled catalytic oxidation of the alicyclic hydrocarbon to form a ketonic compound having the same number of carbon atoms per molecule as the starting hydrocarbon employed, contacting at least a portion of the effluent mixture, substantially as soon as formed, with a basic compound thereby effecting a reaction between said basic compound and the hydrogen bromide present in the effluent mixture, and recovering the ketonic compound from the resulting mixture.

9. A process for the production and recovery of acetophenone which comprises reacting a vaporous mixture comprising ethyl benzene and oxygen in the presence of hydrogen bromide, at a temperature of between about 100° C. and the temperature at which spontaneous combustion of the mixture occurs, and for a period of time sufficient to effect the controlled catalytic oxidation of the ethyl benzene to form acetophenone, contacting at least a portion of the effluent reaction mixture, substantially as soon as formed, with a basic compound thereby effecting a reaction between said basic compound and the hydrogen bromide present in the effluent mixture, and recovering acetophenone from the resulting mixture.

10. A process for the production and recovery of oxygenated organic compounds which comprises reacting an alkylated aromatic hydrocarbon containing an alkyl radical of at least two carbon atoms with oxygen in the presence of hydrogen bromide at a temperature of between about 100° C. and the temperature at which spontaneous combustion of the mixture occurs, contacting the effluent reaction mixture, substantially as soon as formed, with a basic compound thereby effecting a reaction between said basic compound and the hydrogen bromide present in the effluent reaction mixture, and recovering the oxygenated organic compounds from the resulting reaction mixture.

11. A process for the controlled oxidation of organic compounds to produce oxygenated compounds having at least the same number of carbon atoms per molecule as the starting organic compound, which comprises reacting an organic compound selected from the group consisting of saturated aliphatic hydrocarbons having at least three carbon atoms per molecule, alicyclic hydrocarbons and alkylated aromatic hydrocarbons containing an alkyl radical of at least two carbon atoms with oxygen in the presence of hydrogen bromide and at a temperature of between about 100° C. and the temperature at which spontaneous combustion of the mixture occurs, contacting the effluent reaction mixture, substantially as soon as formed, with a basic compound thereby effecting a reaction between said basic compound and the hydrogen bromide present in the effluent reaction mixture, and recovering the oxygenated organic compounds from the resulting reaction mixture.

12. In a process for the controlled oxidation of organic compounds to produce oxygenated compounds having at least the same number of carbon atoms per molecule as the starting organic compound, which process comprises subjecting an organic compound selected from the group consisting of saturated aliphatic hydrocarbons having at least three carbon atoms per molecule, alicyclic hydrocarbons and alkylated aromatic hydrocarbons containing an alkyl radical of at least two carbon atoms to the action of oxygen and of hydrogen bromide at an elevated temperature below that at which spontaneous combustion occurs, the improvement which comprises contacting the effluent reaction mixture thus formed with a basic compound to effect a reaction between said basic compound and the hydrogen bromide present in the reaction mixture, thereby rendering said hydrogen bromide innocuous during the subsequent recovery of the oxygenated organic compounds.

FREDERICK F. RUST.
EDWARD R. BELL.